United States Patent [19]

Kato et al.

[11] Patent Number: 4,900,983

[45] Date of Patent: Feb. 13, 1990

[54] CATHODE RAY TUBE EMPLOYING INDEX PHOSPHOR ELEMENTS ADHERED TO A COLOR SELECTIVE ELECTRODE

[75] Inventors: Hiroshi Kato; Hiromasa Mori; Yoshirou Ishikawa, all of Kanagawa, Japan

[73] Assignee: Sony Corporation, Tokyo, Japan

[21] Appl. No.: 204,036

[22] Filed: Jun. 8, 1988

[30] Foreign Application Priority Data

Jun. 25, 1987 [JP]  Japan ................................. 62-158517

[51] Int. Cl.$^4$ ............................................. H01J 29/22
[52] U.S. Cl. ........................................ 313/471; 427/68
[58] Field of Search .................... 313/471, 466–468; 427/68; 252/301.4 P

[56]  References Cited

U.S. PATENT DOCUMENTS 4,103,069  7/1978  Schulze et al. ...................... 427/68
4,451,504  5/1984  Gallaro et al. ...................... 427/68
4,456,853  6/1984  Robinder et al. ................... 313/421

FOREIGN PATENT DOCUMENTS 519983    4/1940   United Kingdom .
739371   10/1955   United Kingdom .
1308768   3/1973   United Kingdom .
2102195   1/1983   United Kingdom .

Primary Examiner—Donald J. Yusko
Assistant Examiner—Michael Horabik
Attorney, Agent, or Firm—Hill, Van Santen, Steadman & Simpson

[57] ABSTRACT

A color cathode ray tube includes an automatic convergence unit employing index elements on the reverse surface of a color-selective electrode. The paste used for forming the index elements has a composition consisting essentially of index phosphors, an inorganic adhesive and water to assure the adhesive force of the index elements onto the color selective electrode to prevent peeling of the index elements while facilitating the coating operation for formation of the index elements.

1 Claim, 2 Drawing Sheets

CATHODE RAY TUBE EMPLOYING INDEX PHOSPHOR ELEMENTS ADHERED TO A COLOR SELECTIVE ELECTRODE

BACKGROUND OF THE INVENTION

1. Field of the Invention

This invention relates to a color cathode ray tube and more particularly to a color cathode ray tube including an automatic convergence unit employing index phosphor elements on the reverse surface of a color-selective electrode.

2. Description of the Prior Art

In cathode ray tubes, three cathode rays or electron beams are usually employed, these rays or beams being emitted from electron guns and transmitted to three types of phosphors R, G and B provided on the display surface. Unless each of these rays or beams is converged on one predetermined point on the color-selective electrode, a so-called color shift occurs.

In color cathode ray tubes employed for high accuracy display on a so-called color monitor, it has been suggested to provide a so-called automatic convergence unit, according to which, for preventing the aforementioned color shift, the sweeping position of the cathode rays is corrected on the basis of the light emitted when the cathode rays sweep index elements formed on the reverse surface of the color-selective electrode facing to the electron gun.

These cathode ray tubes are provided with index elements formed by coating index phosphors on the surface of the color-selective electrode facing to the electron gun with a predetermined pattern configuration, as proposed in the Japanese Patent Applications KOKAI Nos. 58-24186, 58-25042 and 61-156623.

For forming these index elements, the aforementioned reverse surface of the color-selective electrode is masked with a predetermined pattern configuration and spray-coated with a paste containing index phosphors, such as P46 or P47. Such paste may include the aforementioned index phosphors as a mixture with a binder such as nitrocellulose dissolved in an organic solvent system.

When the paste coated as described above for forming the index element is dried in situ, the organic solvent is evaporated so that there remain only the index phosphors and the binder on the electrode surface. Since the index phosphors are affixed to the color-selective electrode by the binder with only a weak force, they are peeled off when incidentally contacted by hands or fingers. The index elements may also be peeled off when air blowing, for example, is resorted to for removing the index phosphors affixed to the slits formed on the color-selective electrode. In addition, when the color cathode ray tube in its entirety, inclusive of the aforementioned paste, is heated to a temperature of 380° to 450° C., during a step following the coating, such as for baking or frit sealing the tube bulb, the binder is burned and scattered, so that only the index phosphors remain on the index elements. Since the index phosphors do not have the intrinsic adhesive force, the index elements may be peeled off easily with vibration or shock.

When the index elements are peeled off, the signal output level resulting from the light emitted from the index elements is lowered so that the sweeping positions of the cathode rays cannot be corrected accurately. Also, when the index phosphors thus peeled off are affixed, for example, to the electron gun, electrical discharge may occur to render it difficult to produce a high quality image or picture.

Since the organic solvent is contained in the paste, attention is required to maintain the plant in a ventilated condition by provision of a special ventilator, with the result that the paste coating operation cannot be performed easily and economically.

OBJECTS AND SUMMARY OF THE INVENTION

In view of the foregoing, it is a principal object of the present invention to provide a cathode ray tube wherein the force of adhesion of the index phosphors to the index elements is assured, to prevent peeling of the index elements, while facilitating the coating operation for the formation of the index elements.

For accomplishing the above object, the present invention provides a cathode ray tube comprising a tube bulb with means for producing cathode rays, deflecting means outside of said tube bulb for controlling the direction of the cathode rays emitted by said cathode ray producing means, a color-selective electrode in said tube bulb and adapted for color-selecting said cathode rays and projecting the color-selected rays onto the phosphor surface formed on the inner surface of said tube bulb, index element means formed on the surface of said color-selective electrode facing to said cathode ray producing means, means for sensing signals produced when said cathode rays are projected onto said index element means, and an automatic convergence unit responsive to output signals of said sensing means to control said deflecting means, wherein, according to the present invention, the index element means is a paste consisting essentially of a mixture of index phosphors, an inorganic adhesive and water, and being coated and dried in situ on said surface, said paste having a composition wherein the ratio of the weight of the index phosphors P to that of the inorganic adhesive M is given by $$M/P \geqq 0.25$$

and, to 100 milliliters of the sum of the volume of the inorganic adhesive m and that of water w, the weight of the index phosphors P in grams and the volume of the inorganic adhesive m in milliliters, satisfy the formulae $60 \leqq P \leqq 120$ and $m \leqq 60$.

The index elements in the color cathode ray tube according to the present invention, consisting essentially of a mixture of the index phosphors, the inorganic adhesive and water in the form of a paste, which is coated and dried in situ, assures a sufficient adhesive force of the index phosphors to the color-selective electrode to prevent peeling of the index elements.

Since no toxic volatile constituents, such as the organic solvents, are contained in the paste, there is no requirement for special ventilation at the time of coating for formation of the index elements, and the paste coating operation is thereby facilitated.

The present invention thus provides a color cathode ray tube wherein the peeling of the index elements is prevented so that accurate correction of the sweeping position of the cathode rays, and the display of a high quality image are assured, while the coating operation for the formation of the index elements is facilitated.

The above and other objects, features and advantages of the present invention will become apparent from the following detailed description of illustrative embodiments thereof to be read in conjunction with the accompanying drawings, in which like reference numerals represent the same or similar elements.

DETAILED DESCRIPTION OF THE PREFERRED EMBODIMENTS

Figure 1:
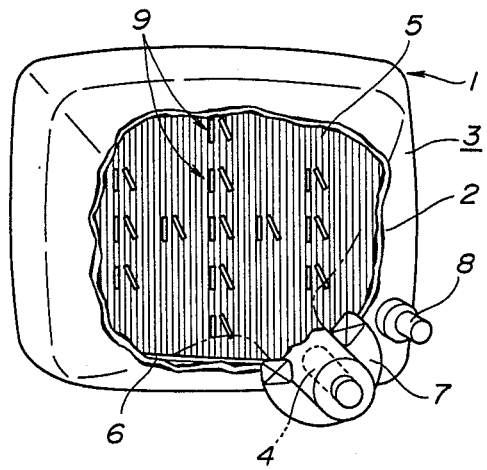
FIG. 1 is a perspective view, shown partially in section and showing the construction of a color cathode ray tube according to a preferred embodiment of the present invention.

Referring to FIG. 1, the color cathode ray tube according to the present invention includes a tube-bulb 3 consisting of a panel section 1 as a display surface and a funnel section 2 continuous with the panel section 1. The tube-bulb 3 is formed of a transparent material, such as glass, and has an interior maintained substantially at a vacuum.

An electron gun 4 as a means for producing cathode rays is provided in position within the tube-bulb 3. The gun 4 is so oriented that the cathode rays are directed to the phosphor surface formed on the inner surface of the panel section 1.

A color-sensitive electrode 5 is placed parallel to and at a prescribed distance from the inner phosphor surface of the panel section 1. This color-selective electrode 5 is in the form of a thin plate formed with a predetermined large number of parallel slits. The electrode 5 is secured to a frame 6, and supported by suitable supporting means, not shown so that the aforementioned slits run parallel to the red(R), green(G) and blue(B) phosphor stripes making up the aforementioned phosphor surface.

The color cathode ray tube is provided with a so-called automatic convergence system for correcting the color shift caused by relative shift of the arrival points of the three color rays at the color-selective electrode 5.

Figure 2:
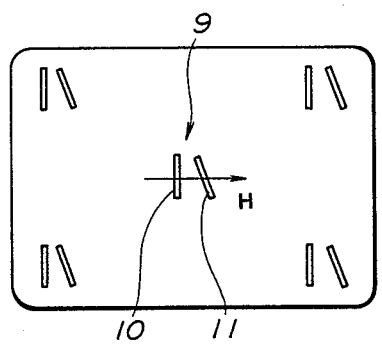
FIG. 2 is a diagrammatic view showing the contour of the index elements of the color cathode ray tube.

For cooperation with the automatic convergence system, index elements 9 are provided at a number of points on the reverse side of the electrode 5 facing to the electron gun 4, as shown in FIG. 2. The index element 9 is comprised of a vertical leg 10 orthogonal to the sweeping direction of the cathode rays indicated by the arrow mark H in FIG. 2 and a leg 11 inclined at a predetermined angle $\theta$ relative to the sweeping direction.

The principle of the automatic convergence system is hereafter explained. When the index element 9 is swept by the cathode rays, the element 9 emits the light. When the cathode rays sweep the predetermined position as indicated by the arrow mark $h_1$ (FIG. 3), the distance between the vertical leg 10 and the inclined leg 11 on the sweeping trajectory has a predetermined length $l_1$ in FIG. 3. The arrow marks H and V in FIG. 3 indicate the horizontal and vertical directions on the display screen of the cathode ray tube. With the sweeping velocity v of the cathode rays, it is after the lapse of time $l_1/v$ since the cathode rays pass through the vertical leg 10, until these rays pass through the inclined leg 11. Therefore, when the cathode rays sweep the predetermined position indicated by the arrow mark $h_1$, light emission occurs twice at an interval of time equal to $l_1/v$. However, when the cathode rays sweep a position indicated by the arrow mark $h_2$, which is off the predetermined position, the distance between the vertical leg 10 and the inclined leg 11 on the sweeping trajectory has a length $l_2$. Assuming the sweeping velocity of the cathode rays to be constant, it is after the lapse of time of $l_2/v$ since the cathode rays pass through the vertical leg 10 that the cathode rays pass through the inclined leg 11. Therefore, when the cathode rays sweep a position off the predetermined position as indicated by the arrow mark $h_2$, light emission occurs twice at an interval of time of $l_2/v$.

Such light emission, occurring twice by the cathode rays sweeping the index element 9, is sensed by a sensor 8. When the cathode rays sweep the aforementioned predetermined position, the sensor 8 issues two pulses spaced by a time interval of $l_1/v$ as indicated by a waveform $P_1$ in FIG. 3. When the cathode rays sweep the position off the predetermined position, the sensor 8 issues two pulses spaced by a time interval $l_2/v$ as indicated by a waveform $P_2$ in FIG. 3.

Figure 3:
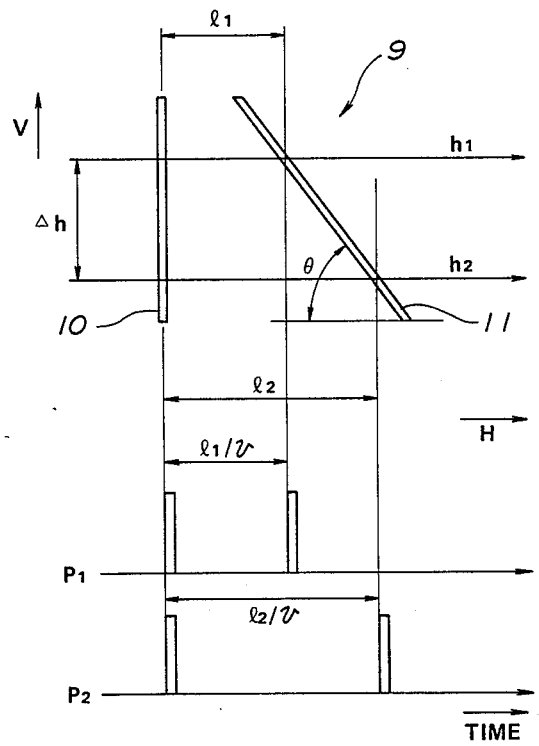
FIG. 3 is a diagrammatic view for illustrating the principle of the automatic convergence unit of the cathode ray tube.

Thus, from the difference in the time intervals between the two pulses of the two pulse sets, that is $(l_2-l_1)/v$, the scanning velocity v and the prescribed angle of inclination $\theta$ of the inclined leg 11, it is possible to compute the shift of the current sweeping position from the prescribed sweeping position, indicated by the $\Delta h$ in FIG. 3. The deflection coils 7 controlling the direction of the cathode rays can be moved on the basis of the computed shift to correct the direction of the cathode rays to coincide the scanning position with the predetermined position.

When the sweeping position of a prescribed one of the three cathode rays adopted as a reference is used as the predetermined position, and the respective scanning positions of the other two cathode rays are corrected so as to be coincident with the predetermined position, each of the three cathode rays is converged at one point on the color-selective electrode 5 to prevent color shift from occurring.

It should be noticed that the aforementioned index element 9 consists of preselected index phosphors, such as P46 and P47, an inorganic adhesive and water mixed together to a paste which is spray-coated in a predetermined pattern configuration on the aforementioned reverse surface of the color selective electrode 5 so as to be dried and cured.

The sequence of operations for forming the index element 9 is as follows: a mask is secured by a magnet on the aforementioned reverse surface of the color-selective electrode 5 for masking the aforementioned predetermined pattern configuration. The color-selective electrode 5 is heated to about 110° C. by a constant temperature bath. The aforementioned paste is spray-coated by a sprayer on the color-selective electrode 5 from above the mask, after which the mask is removed. When the paste remains affixed in the slits of the color-selective electrode 5, the three cathode rays for displaying the image after the completion of the manufacture of the cathode ray tube are interrupted by the paste and cannot reach the phosphor surface, so that an optimum image cannot be produced. For this reason, the aforementioned paste affixed to the slits and the surface of the color-selective electrode 5 is removed. The aforementioned inorganic adhesive contained in its paste is cured by a baking step in, for example, a frit sealing process of heating the color cathode ray tube in the entirety to an elevated temperature of 380° to 450° C., following the predetermined processing of the inside of the tube-bulb 3 inclusive of the color selective electrode 5, for affixing the index phosphor to the color-selective electrode 5.

For assuring the adhesive force of the index element 9 to the color-selective electrode 5 and optimum spray coating, the paste composition is selected to satisfy the following formulas I to III;

$$M/P \geq 0.25 \quad \quad \quad (I)$$

$$0.6 \leq P/(m+w) \leq 1.2 \quad \quad \quad (II)$$

$$m/(m+w) \leq 0.6 \quad \quad \quad (III)$$

wherein P denotes the weight of the index phosphor in grams, M the weight of the inorganic adhesive in grams, m the volume of the inorganic adhesive in milliliters and w the volume of water in milliliters.

The inorganic adhesive consisting, for example, essentially of aluminium phosphate, such as that sold under the trade name of monophix, may be employed. Since the specific gravity of monophix is about 1.5, $m = M/1.5$.

Figure 4:
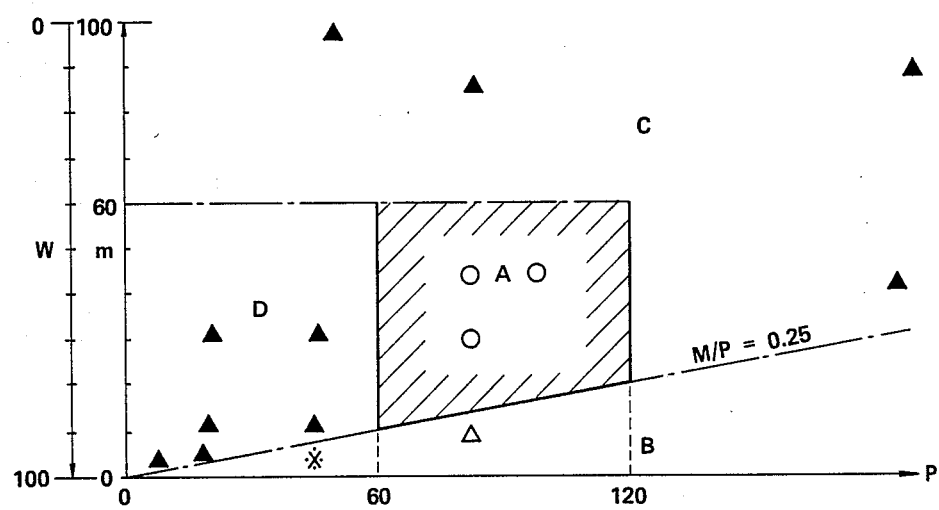
FIG. 4 is a chart for illustrating the composition of the paste employed for the formation of the index elements of the color cathode ray tube.

The conditions governing the aforementioned paste composition may be represented by a region indicated A in FIG. 4. In this figure, the total volume of the paste, which is the sum of the volume of the inorganic adhesive and that of water, that is, (m+w) in the formulas (II) and (III), is set so as to be equal to 100 milliliters.

It will be noted that, when the paste composition is unable to satisfy the formula (I), such that $$M/P < 0.25$$

and thus the composition is represented by B in FIG. 4, the contents of the inorganic adhesive in the paste are reduced so that a sufficient adhesive force of the index element to the color-selective electrode 5 is not obtained.

Also, when the composition of the paste is such that, in connection with the formulas (II) and (III), $$P/(m+w) > 1.2$$

or $$m/(m+w) > 0.6$$

and thus the composition is represented by C in FIG. 4, the paste has an increased viscosity so that difficulties are presented in spray coating the composition by the spraying device.

In addition, when the composition of the paste is such that, in connection with the formulas (II) and (III), $$P/(m+w) < 0.6$$

and $$m/(m+w) < 0.6$$

and thus the composition is represented by D in FIG. 4, the viscosity of the paste is lowered, while the total volume of the paste that is applied in order for the required amount of the index phosphor to be affixed to the color-selective electrode 5 is increased. Thus, when the paste is spray coated on the aforementioned reverse surface of the color-selective electrode 5, an increased amount of the paste flows into the slits and onto the surface of the electrode, so that difficulties are presented in forming the index elements 9 to a predetermined pattern configuration.

It will be noted that the marks o, Δ, and in FIG. 4 are used for plotting the compositions according to the present invention and those of certain comparative examples, wherein the marks o, Δ, and respectively that both the adhesive force and the spraying operability are excellent; that the spraying operability is excellent but the adhesive force is insufficient; that the adhesive force is excellent but the spraying operability is inferior; and that both the adhesive force and the spraying operability are inferior.

The paste coated on the electrode surface for producing the index elements in the preparation of the color cathode ray tube in accordance with the present invention is composed of the index phosphor, the inorganic adhesive and water, so that it is unnecessary to take precautions in ventilation and special separate ventilators are not required.

The color cathode ray tube of the present invention is not limited to the above embodiments, but may be modified appropriately. For example, the inorganic adhesive is not limited to the aforementioned monophix but any other inorganic adhesive may suitably be employed.

Also, the electron gun and the deflection coils are merely illustrative as the cathode ray emitting means and deflecting means and any other type of the cathode ray emitting and deflecting means may also be employed.

It will be apparent that various modifications and/or additions may be made in the apparatus of the invention without departing from the essential feature of novelty involved, which are intended to be defined and secured by the appended claims.

What is claimed is:

1. A color cathode ray tube comprising
   a tube bulb having means for producing cathode rays,
   deflecting means outside of said tube bulb for controlling the direction of the cathode rays emitted by said cathode ray producing means,
   a color-selective electrode in said tube bulb and adapted for color-selecting said cathode rays and projecting the color-selected rays on the phosphor surface formed on the inner surface of said tube bulb,
   index element means formed on the surface of said color-selective electrode facing to said cathode ray producing means,
   means for sensing signals produced when said cathode rays are projected onto said index element means, and
   an automatic convergence unit responsive to output signals of said sensing means to control said deflecting means,
   wherein the improvement comprises said index element means comprising a paste consisting essentially of a mixture of index phosphors, an inorganic adhesive and water and is formed by being coated and dried in situ on said surface, said paste having a composition represented by the formulae $$M/P \geq 0.25,$$

$$0.6 \leq P/(m+w) \leq 1.2, \text{ and}$$

$$m/(m+w) \leq 0.6$$

wherein P denotes the weight of the index phosphors in grams, M the weight of said inorganic adhesive in grams, m the volume of said inorganic adhesive in milliliters and w the volume of the water in milliliters.

* * * * *